United States Patent [19]

Matsuda et al.

[11] Patent Number: 5,088,040
[45] Date of Patent: Feb. 11, 1992

[54] AUTOMOTIVE CONTROL SYSTEM PROVIDING ANTI-SKID STEERING

[75] Inventors: Toshiro Matsuda; Kazuo Chiba, both of Kanagawa, Japan

[73] Assignee: Nissan Motor Company, Limited, Yokohama, Japan

[21] Appl. No.: 464,885

[22] Filed: Jan. 17, 1990

[30] Foreign Application Priority Data

Jan. 18, 1989 [JP] Japan .................................. 1-4009

[51] Int. Cl.⁵ ............................................... B62D 6/00
[52] U.S. Cl. ........................... 364/424.05; 364/426.02; 180/140; 280/91
[58] Field of Search ................................. 364/424.05; 180/140–142; 280/91

[56] References Cited

U.S. PATENT DOCUMENTS 4,716,982  1/1988  Ishii et al. ........................... 180/140
4,828,064  5/1989  Furutani et al. ..................... 180/140

Primary Examiner—Thomas G. Black
Attorney, Agent, or Firm—Foley & Lardner

[57] ABSTRACT

A control system for a four wheel steering system detects the occurrence of wheel slippage for sampling wheel speed data immediately before the occurrence of wheel slippage. The control system projects a vehicle speed on the basis of the sampled wheel speed data and a predetermined variation rate of the vehicle speed, and derives toe angle variation magnitude of a subsidiary steerable wheel on the basis of the projected vehicle speed and a steering angle of a primary steerable wheel.

16 Claims, 8 Drawing Sheets

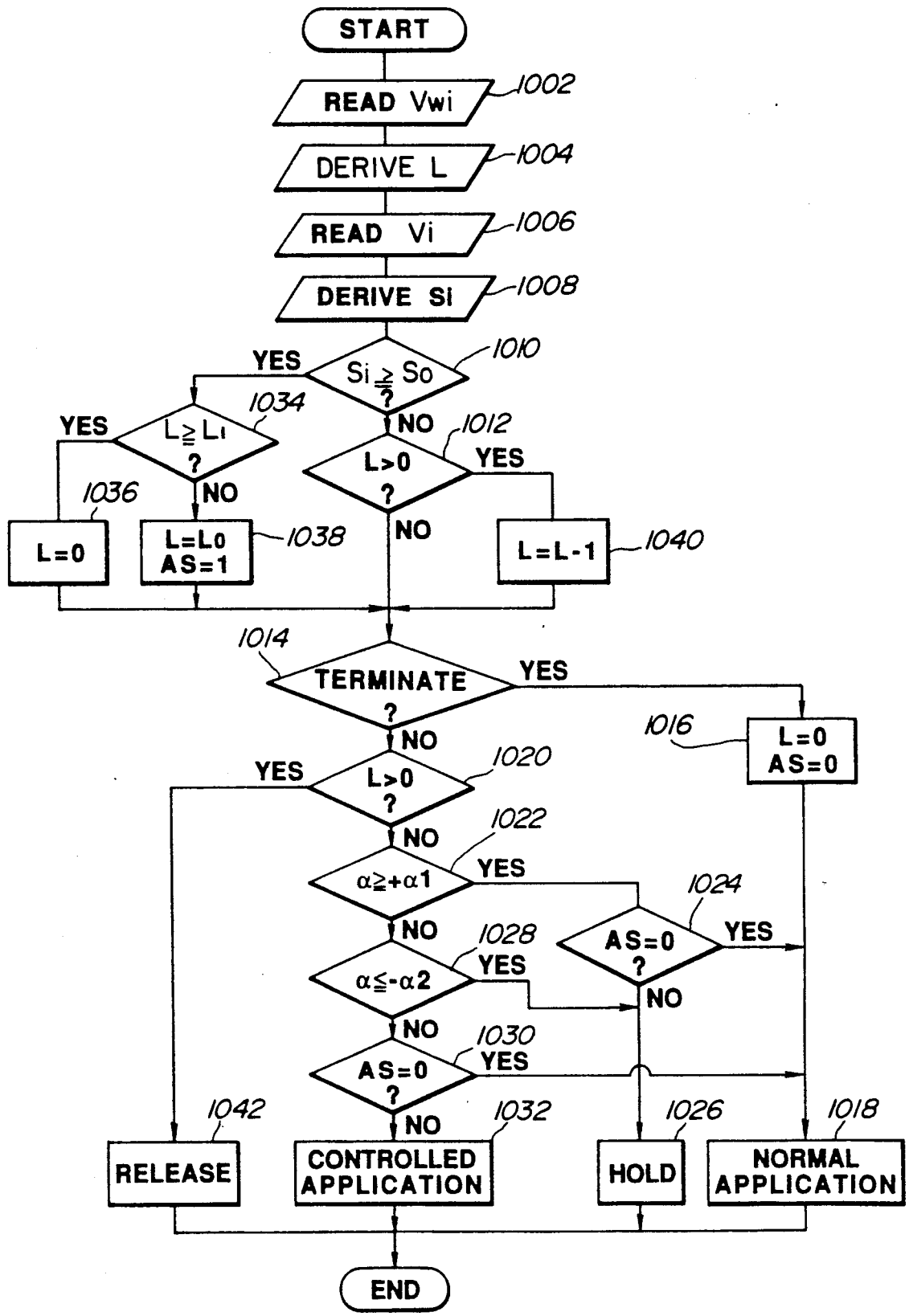

AUTOMOTIVE CONTROL SYSTEM PROVIDING ANTI-SKID STEERING

BACKGROUND OF THE INVENTION

The present invention relates to an automotive steering control system, including an assistant steering mechanism for providing assisting force for operating a main steering mechanism, such as a rack-and-pinion steering mechanism. Specifically, it relates to a steering control system capable of providing a stable assisting force for the main steering mechanism when an anti-skid brake control is active. More specifically, the invention relates to a steering angle control system for a four wheel steerable vehicle, for which an anti-skid brake control system for controlling vehicular braking behavior is facilitated.

1. Field of the Invention

Recently, there has been proposed and developed an automotive steering control system employing an assistant steering mechanism which is comprised of a power assist cylinder. As is well known, such a power assist cylinder is traditionally employed in four wheel steering systems.

One example of four wheel steering system has been disclosed in Japanese Patent First (unexamined) Publication (Tokkai) Showa 59-143770. Such prior proposed steering system controls toe angle of rear wheels as subsidiary steerable wheels on the basis of a vehicle speed and a steering angle of front wheels as primary steerable wheels. Namely, toe angle displacement magnitude of the subsidiary steerable wheels is derived arithmetically on the basis of the vehicle speed and the steering angle displacement magnitude of the primary wheels. The subsidiary steerable wheels are associated with a subsidiary steerable wheel actuation mechanism including a pulse motor which is driven in response to a subsidiary steerable wheel control signal to cause toe angle change.

Typically, the vehicle speed is monitored by means of a vehicle speed sensor which is adapted to monitor rotation speed of driving wheel for deriving the vehicle speed based thereon. This manner of derivation of the toe angle change magnitude is effective as long as the driving wheel speed substantially corresponds to the vehicle speed. On the other hand, a difficulty is encountered in deriving the toe angle variation magnitude based on the driving wheel speed and the steering angle of the primary steerable wheel when the driving wheel speed does correspond to the vehicle speed. For instance, while an anti-skid brake control is active, the wheel speed vibratingly fluctuates according to skid control cycle of the anti-skid control.

SUMMARY OF THE INVENTION

Therefore, it is an object of the present invention to provide an automotive steering control system employing an assist steering mechanism which can provide a stable assisting force for a main steering mechanism, such as a rack-and-pinion steering mechanism, so as to be unaffected by speed fluctuations or oscillating speed variations occurring in a vehicle wheel speed when an anti-skid brake control is active.

Another object of the invention is to provide an improved automotive steering control system employing an assistant steering mechanism, which can provide a stable vehicle speed representing data dependent on vehicle wheel speeds, as a control parameter therefor, irrespective of fluctuations in wheel speeds.

A further object of the invention is to provide an improved steering control system for an automotive vehicle employing an assistant steering mechanism and an anti-skid brake control system, which can provide a stable vehicle speed representing data dependent on vehicle wheel speeds, irrespective of fluctuations in the wheel speeds due to the anti-skid control cycle occurring when the anti-skid control system is active.

Another object of the invention is to provide a four wheel steering control system which can project vehicle speed even when driving wheel speed vibratingly varies and does not correspond to the vehicle speed.

In order to accomplish aforementioned and other objects, a control system for a four wheel steering system, according to the present invention, detects occurrence of wheel slippage for sampling wheel speed data immediately before the occurrence of wheel slippage. The control system projects a vehicle speed on the basis of the sampled wheel speed data and a predetermined variation rate of the vehicle speed, and derives toe angle variation magnitude of a subsidiary steerable wheel on the basis of the projected vehicle speed and a steering angle of a primary steerable wheel.

According to one aspect of the invention, a four wheel steering control system for an automotive vehicle which includes a primary steerable wheel associated with a manually operable vehicular steering mechanism, and a subsidiary steerable wheel, the control system comprises:

a subsidiary wheel toe control mechanism associated with the subsidiary steerable wheel for controlling toe angle according to a subsidiary wheel steering control signal;

a steering angle sensing means associated with the manually operable steering mechanism for producing a steering angle indicative signal representative of magnitude of manually entered steering demand for the primary steerable wheel;

a vehicle speed data generating means for monitoring a preselected parameter reflecting traveling speed of a vehicle body, and latching an instantaneous preselected parameter value at a predetermined vehicle driving condition as an initial vehicle speed representative data and modifying the initial vehicle speed representative data at a predetermined variation rate for deriving vehicle speed data; and a control means receiving the steering angle indicative signal and the vehicle speed data for deriving the subsidiary wheel steering control signal based thereon.

Preferably, the vehicle speed data generating means modifies the initial vehicle speed representative data as a function of an elapsed time. The the vehicle speed data generating means may monitor a wheel speed as the preselected parameter and detecting the wheel speed varying irrespective of vehicle speed for latching the wheel speed immediately before the occurrence of wheel speed variation irrespective of the vehicle speed.

The fourth wheel steering control system may be associated with a control system which performs control for maintaining a wheel slippage at a predetermined level. In such case, it is preferred that the vehicle speed representative data generating means is commonly employed in both of the control systems.

According to another aspect of the invention, a four wheel steering control system for an automotive vehicle which includes a primary steerable wheel associated with a manually operable vehicular steering mechanism, and a subsidiary steerable wheel, the control system comprises:

a subsidiary wheel toe control mechanism associated with the subsidiary steerable wheel for controlling toe angle according to a subsidiary wheel steering control signal;

a steering angle sensing means associated with the manually operable steering mechanism for producing a steering angle indicative signal representative of magnitude of manually entered steering demand for the primary steerable wheel;

a wheel speed monitoring means for monitoring rotation speed of each of the primary and subsidiary steerable wheels for producing a wheel speed indicative signal;

a vehicle speed data generating means for receiving the wheel speed indicative signal for latching an instantaneous wheel speed indicative signal value at a predetermined timing as an initial vehicle speed representative data and modifying the initial vehicle speed representative data at a predetermined variation rate for deriving vehicle speed data; and a control means receiving the steering angle indicative signal and the vehicle speed data for deriving the subsidiary wheel steering control signal based thereon.

According to a further aspect of the invention, a combination of a four wheel steering control system for an automotive vehicle which includes a primary steerable wheel associated with a manually operable vehicular steering mechanism, and a subsidiary steerable wheel, and an anti-skid brake control system which controls braking pressure applied for respective wheels on the basis of a wheel slippage derived on the basis of the wheel speed and a vehicle speed representative data, the four wheel steering control system comprises:

a subsidiary wheel toe control mechanism associated with the subsidiary steerable wheel for controlling toe angle according to a subsidiary wheel steering control signal;

a steering angle sensing means associated with the manually operable steering mechanism for producing a steering angle indicative signal representative of magnitude of manually entered steering demand for the primary steerable wheel;

a wheel speed monitoring means for monitoring rotation speed of each of the primary and subsidiary steerable wheels for producing a wheel speed indicative signal;

a vehicle speed data generating means for receiving the wheel speed indicative signal for latching an instantaneous wheel speed indicative signal value at a predetermined timing as an initial vehicle speed representative data and modifying the initial vehicle speed representative data at a predetermined variation rate for deriving vehicle speed data; and a control means receiving the steering angle indicative signal and the vehicle speed data for deriving the subsidiary wheel steering control signal based thereon.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 5 is a flowchart showing process of an anti-skid brake control to be performed by the anti-skid brake control system of FIG. 2;

DESCRIPTION OF THE PREFERRED EMBODIMENT

Figure 1:
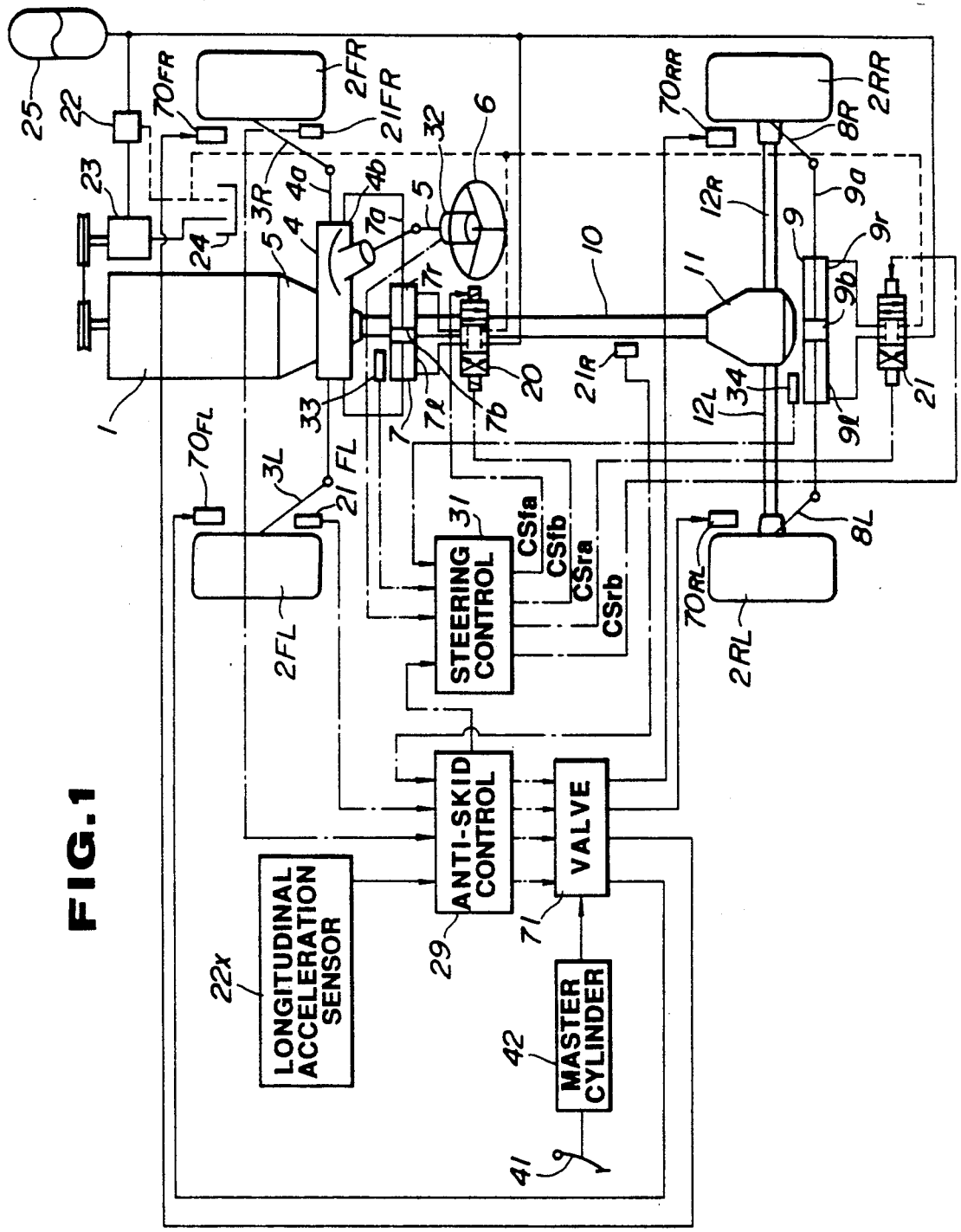
FIG. 1 is a schematic diagram of an automotive vehicle, for which the preferred embodiment of four wheel steering control system and an anti-skid brake control system are facilitated.
Figure 2:
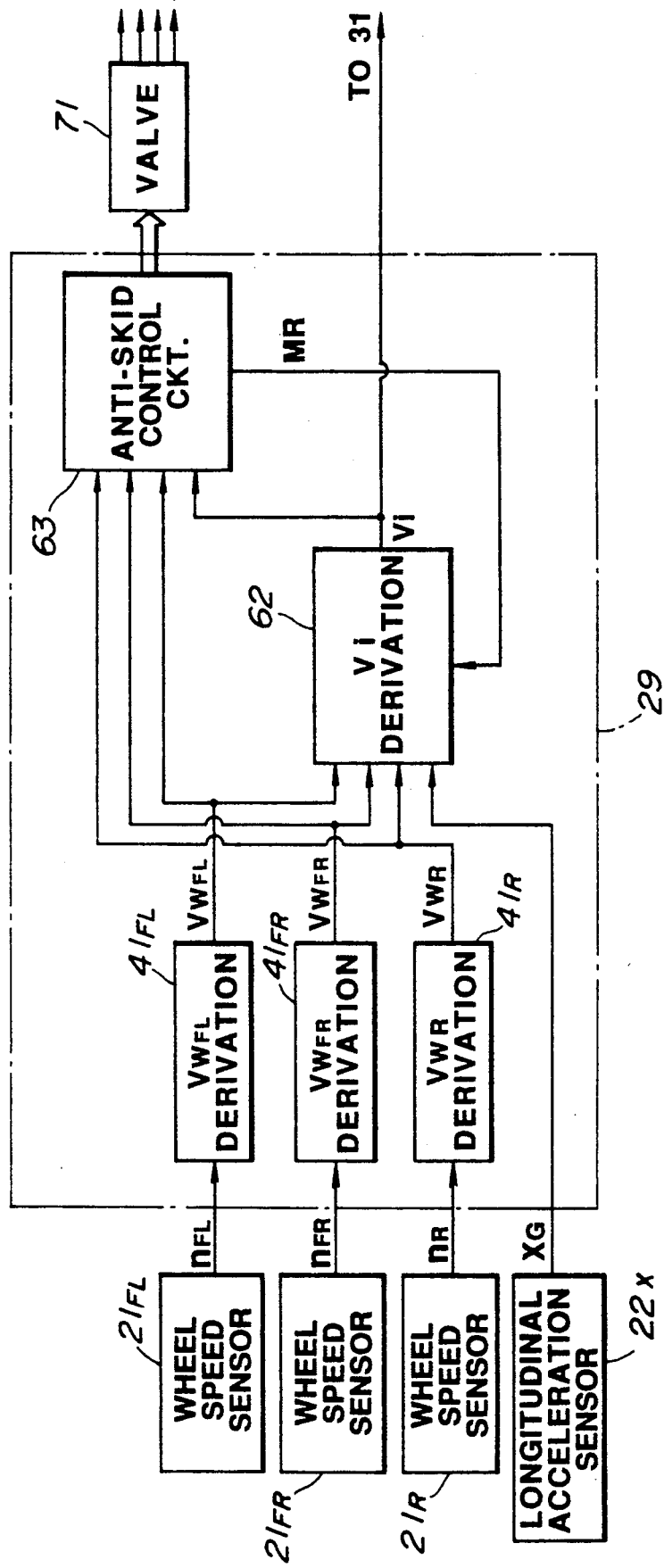
FIG. 2 is a schematic block diagram of an anti-skid brake control system which includes a circuit for projecting a vehicle speed data on the basis of wheel speed data.

Referring now to the drawings particularly to FIGS. 1 and 2, a vehicle illustrated herein has front-left and front-right wheels 2FL and 2FR as primary steerable wheels and rear-left and rear-right wheels 2RL and 2RR as subsidiary steerable wheels. The front-left and front-right wheels 2FL and 2FR are connected to an actuation rod 4a of a steering mechanism 4, such as rack-and-pinion steering mechanism. The steering mechanism 4 is associated with a steering wheel 6 via a steering shaft 5. Therefore, according to steering operation through the steering wheel 6, the front-left and front-right wheels 2FL and 2FR are synchroneously operated to cause toe angle variation. A power assist cylinder 7 is connected to a rack housing 4b of the steering mechanism. The power assist cylinder 7 serves as an assist steering mechanism for the steering mechanism 4. The power assist cylinder 7 has a piston rod 7a connected to the rack housing 4b, for providing assisting force for operating the steering mechanism.

On the other hand, the rear-left and rear-right wheels 2RL and 2RR are connected to a piston rod of a rear subsidiary wheel steering cylinder 9 for controlling toe angle at the subsidiary steerable wheels, i.e. the rear-left and rear-right wheels.

For the rear wheels 2RL and 2RR, an automotive internal combustion engine 1 is connected via a power train including a power transmission 5, a propeller shaft 10, a differential gear unit 11 and drive axles 12L and 12R so that the engine output torque is transmitted thereto.

The cylinders 7 and 9 are supported on the vehicle body. The power assist cylinders 7 and 9 respectively employ pistons 7b and 9b being thrustingly disposed therein. By the piston 7b and 9b, left and right working chambers 7l, 7r and 9l, 9r are defined within the cylinders 7 and 9. For these cylinders 7 and 9, a closed center type servo valves 20 and 21 are connected. The servo valves 20f and 20r have inlet ports connected to a hydraulic pump 23 via an unload valve 22, and drain ports connected to a fluid reservoir 24. A pressure accumulator 25 is connected between the unload valve 22 and the cylinders 7 and 9 for accumulating line pressure. These servo valves 20 and 21 are connected to a steering control unit 31 and controlled the valve position by primary and subsidiary steering control signals.

The steering control unit 31 is connected to a steering angle sensor 32, a front cylinder stroke sensor 33 which monitors shifting stroke of the power assisting cylinder 7, and a rear cylinder stroke sensor 34 which monitors shifting stroke of the subsidiary wheel steering cylinder 9. The steering control unit 31 is further connected to an anti-skid control unit 29 which includes a vehicle speed projecting circuit 62 deriving a projected vehicle speed Vi. The steering control unit 31 takes this projected vehicle speed Vi as vehicle speed representative data.

In the practical operation, proportional constants Kf and Kr are derived from the following equation (1) on the basis of the projected vehicle speed Vi.

$$Kf = Kr = \frac{aMCfV^2 + blCfCr}{l^2CfCr + (bCr - aCf)MV^2} \quad (1)$$

wherein
Cf is cornering force at the front wheel,
Cr is cornering force at the rear wheels,
l is a wheel base length,
a is a distance between the front wheel and a gravity center,
b is a distance between the rear wheel and the gravity center,
M is a vehicular mass weight
I is an inertia moment in yawing direction, and
V is a vehicle speed.

Also, according to the following equations (2) and (3), differentiation coefficients $\tau f$ and $\tau r$ are derived as advancing elements.

$$\tau f = \frac{CrIV}{l^2CfCr + (bCr - aCf)MV^2} \quad (2)$$

$$\tau r = \frac{CfIV}{l^2CfCr + (bCr - aCf)MV^2} \quad (3)$$

Based on the proportional constants Kf and Kr and the differentiation coefficients $\tau f$ and $\tau r$, a transfer function Hf(s) of the front wheel toe angle variation $\delta f(s)$ and the steering angle $\theta(s)$ and a transfer function Hr(s) of the rear wheel toe angle variation $\delta r(s)$ and the steering angle $\theta(s)$, according to the following equations (4) and (5).

$$Hf(s) = Kf + \tau f S \quad (4)$$

$$Hr(s) = Kr - \tau r S \quad (5)$$

where S is LaPlace transformation element.
From the above, the toe angle variation $\delta f(s)$ and $\delta r(s)$ can be expressed by:

$$Hf(s) = \delta f(s)/\theta(s) \quad (6)$$

$$Hr(s) = \delta r(s)/\theta(s) \quad (7)$$

By performing LaPlace reverse transformation of $\delta f(s)$ and $\delta r(s)$, toe angle control command values $\delta f$ and $\delta r$ are derived. The steering control unit 31 controls the servo valves 20 and 21 so that the difference between the actual toe angle and the command values $\delta f$ and $\delta r$ becomes zero.

As shown in FIG. 2, the anti-skid brake control unit 29 receives the longitudinal acceleration indicative signal $X_G$ from a longitudinal acceleration sensor 22X. Also, the anti-skid brake control section 29 receives front-left, front-right and rear wheel speed indicative signals $Vw_{FL}$, $Vw_{FR}$ and $Vw_R$ from front-left, front-right and rear wheel speed deriving circuits 41FL, 41FR and 41R which receives wheel speed indicative pulse train from wheel speed sensors nFL, nFR and nR. The anti-skid brake control system includes a vehicle speed representative valve Vi projecting circuit 62 and an anti-skid control circuit 63 which controls actuator or pressure control valve unit 71 for adjusting fluid pressure built-up in front-left, front-right, rear-left and rear-right wheel cylinders 70FL, 70FR, 70RL and 70RR. It should be noted that though FIG. 2 shows only one pressure control valve unit 71 for uniform and mutually dependent skid control for all wheel cylinders, it is possible to provide the actuators for respective wheel cylinders in order to facilitate independent skid control operation per each wheel.

Figure 3:
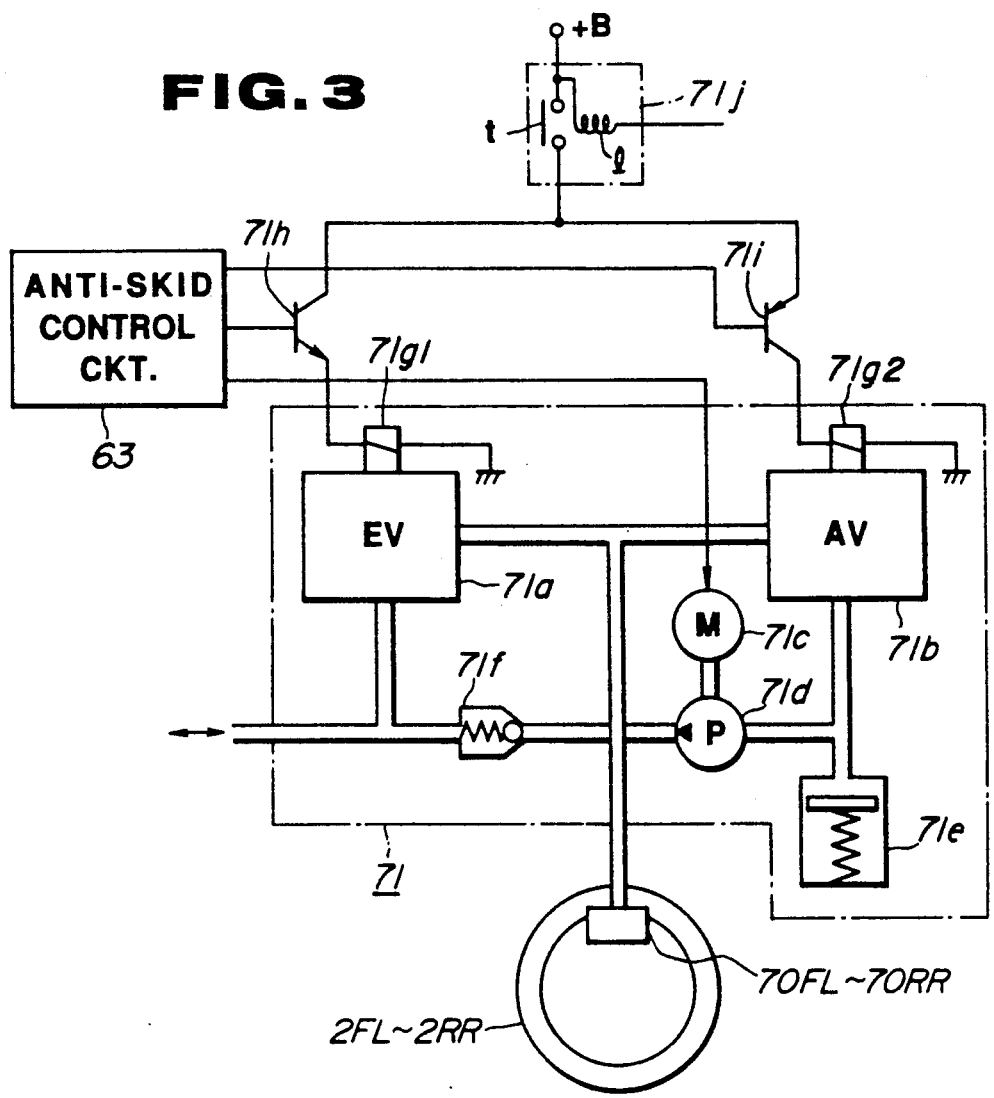
FIG. 3 is a diagram showing construction of a pressure control valve for each channel of hydraulic brake circuit for adjusting braking pressure in each of front-left, front-right, rear-left and rear-right wheels.
Figure 6:
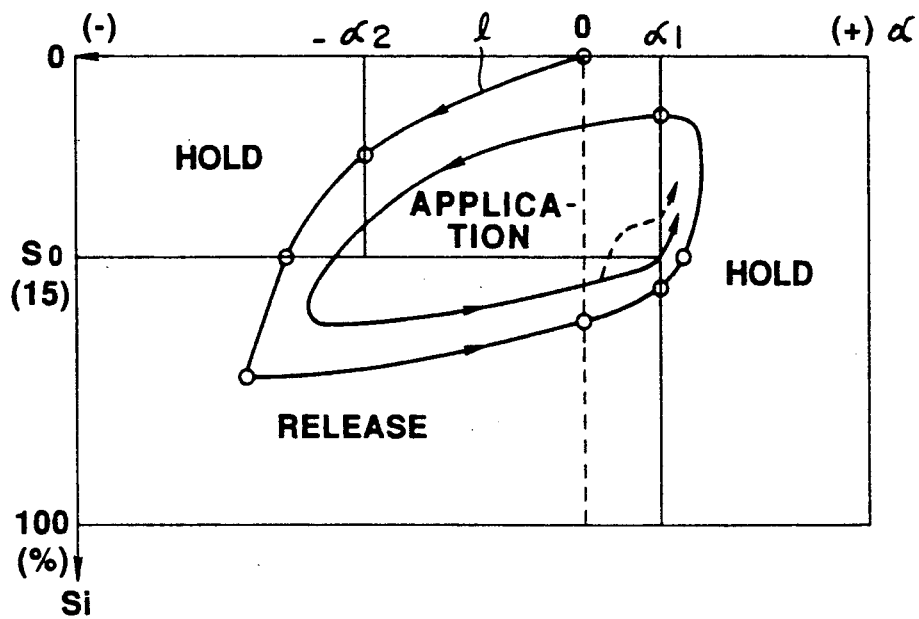
FIG. 6 is a chart showing variation of operational modes of the anti-skid brake control system during skid cycles.

FIG. 3 shows one example of the pressure control valve unit 71 which may be employed in the shown anti-skid brake control. As can be seen from FIG. 3, the pressure control valve unit 71 includes an inlet control (EV) valve 71a and an outlet control (AV) valve 71b. The pressure control valve unit 71 also includes a drain pump 71d driven by means of an electric motor 71c which is controlled by MR signal from the anti-skid control circuit 63. The pressure control valve unit 71 has an inlet port connected to the master cylinder 42 to receive the working fluid pressure built up in the latter and an outlet port connected to the wheel cylinder 70. The EV valve 71a is interposed between the inlet port and the outlet port for controlling introduction of the pressurized working fluid to the wheel cylinder 70. The AV valve 71b is connected to the outlet of the EV valve 71a, the outlet port at the inlet side and to the pressure accumulator 71e and the drain pump 71d. The discharge outlet drain pump 71d is connected to the inlet port via a one-way check valve 71f for returning part of working fluid in the pressure control valve unit 71 to the fluid reservoir (not shown) and designed for supplying pressurized working fluid.

The EV valve 71a includes an electromagnetic actuator 71g₁, such as solenoid. The electromagnetic actuator 71g₁ is connected to the emitter electrode of a power transistor 71h, which comprises PNP transistor and has the base electrode connected to the anti-skid control circuit 63. The collector electrode of the power transistor 71h is connected to the positive power source +B via a relay switch 71j. The relay switch 71j has a normally open contact t. As long as no fault in the acceleration sensors is detected, the relay coil l is held energized for closing normally open contact for establishing electrical connection between the positive power source +B and the collector electrode of the power transistor 71h. Similarly, the AV valve 71b includes an electromagnetic actuator 71g₂, such as solenoid. The electromagnetic actuator 71g₂ is connected to the collector electrode of a power transistor 71i which comprises NPN type transistor and has base electrode connected to the anti-skid control unit 63. On the other hand, the emitter electrode of the power transistor 71i is connected to the positive power source +B via the switching relay 71j.

With the construction set forth above, the pressure control valve unit 71 essentially operates in three mutually different operational modes. Namely, the pressure control valve unit 71 operates in an APPLICATION mode for increasing braking pressure in the wheel cylinder 70, a RELEASE mode for decreasing braking pressure in the wheel cylinder, and a HOLD mode to maintain the braking pressure constant. In the APPLICATION mode position, the EV valve 71a is maintained in open position to establish fluid communication between the master cylinder 42 and the wheel cylinder 70 and the AV valve 71b is maintained closed position for blocking fluid communication between the wheel cylinder 70 and the pressure accumulator 71e. At the same time, the drain pump 71d may be held in an inoperative state.

In the RELEASE mode position of the pressure control valve unit 71, the EV valve 71a is held closed to block fluid communication between the inlet port and the outlet port and whereby blocks pressure supply from the master cylinder 8 to the wheel cylinder 70. At the same time, the AV valve 71b is maintained at open position to establish fluid communication between the outlet port, and the pressure accumulator 71e and the drain pump 71d so that the pressurized fluid in the wheel cylinder 70 can be drained to the pressure accumulator 71e or to the fluid reservoir via the drain pump 71d and the one-way check valve 71f. In order to drain part of the working fluid from the wheel cylinder to the fluid reservoir, the drain pump 71d is driven in this RELEASE mode. On the other hand, in the HOLD mode position, both of the EV valve 71a and the AV valve 71b are held closed for completely disconnecting the wheel cylinder 70 from the inlet port and the pressure accumulator 71e.

The EV valve 71a is held open position in response to LOW level EV signal and shifted to closed position in response to the HIGH level EV signal. On the other hand, the AV valve 71b is maintained at closed position as long as the AV signal is held LOW level and is opened by the HIGH level AV signal. The drain pump 71d is driven by the HIGH level MR signal.

The pressure control valve unit 71 is operated in the aforementioned three mode positions over skid control cycles. In general, skid control cycle is scheduled as follows:

1) the pressure control valve unit 71 is maintained at the APPLICATION mode position upon initiation of the braking operation which is triggered by depression of the brake pedal 41;

2) by application of the braking force to the brake pedal, working fluid pressure is built up in the master cylinder 42, since the pressure control valve unit 71 is held at the APPLICATION mode position, the braking pressure in the wheel cylinder 70 is increased linearly in proportion to increasing of the working fluid pressure to decelerate the wheel speed;

3) by increasing of the braking pressure, wheel deceleration $-\alpha$ (negative value of wheel acceleration) increases and becomes greater than a predetermined deceleration threshold $-\alpha_2$, the anti-skid control unit 63 is responsive to the wheel deceleration increased across the deceleration threshold to initiate skid control cycle, upon which the skid control cycle enters into HOLD mode cycle period to place the pressure control valve unit 71 at the HOLD mode position to maintain the increased level of braking pressure constant;

4) by holding the increase level of braking pressure in the HOLD mode position of the pressure control valve unit 71, wheel is decelerated to increase wheel slippage across a predetermined wheel slippage threshold, the anti-skid control unit 63 is responsive to increasing of the wheel slippage increasing across the wheel slippage threshold to terminal the HOLD mode cycle period and trigger RELEASE mode cycle period, in which the pressure control valve unit 71 is placed in the RELEASE mode position to decrease braking pressure in the wheel cylinder 70;

5) by maintaining the pressure control valve unit 71 in the RELEASE mode position, braking pressure is reduced and thus wheel is accelerated to result in increasing of wheel acceleration $+\alpha$ across a predetermined wheel acceleration threshold $+\alpha_1$, the anti-skid control unit 63 is responsive to increasing of the wheel acceleration $+\alpha$ across the wheel acceleration threshold $+\alpha_1$ to terminate the RELEASE mode cycle period and trigger a HOLD mode cycle period to switch the position of the pressure control valve unit 71 from the RELEASE mode position to the HOLD mode position in order to hold the braking pressure at the lowered level;

6) by maintaining the pressure control valve unit 71 at the HOLD mode, wheel speed is resumed and increased across the vehicle body speed and subsequently return to the speed corresponding to the vehicle body speed, the anti-skid control unit 63 is responsive to the wheel speed once increased across the vehicle body speed and subsequently return to the vehicle body speed to terminate HOLD mode cycle period and trigger APPLICATION mode cycle period;

The skid cycles 3) to 6) are repeated while anti-skid control is active.

The shown embodiment of the anti-skid brake control system is triggered in response to turning ON of the ignition switch to initiate power supply. Then, wheel speed sensors 21FL, 21FR, and 21R start monitoring of rotation speed of respectively corresponding wheels 15. The wheel speed sensors 21FL, 21FR, and 21R thus continuously produce the wheel speed indicative signals $v_w$. The alternating current form wheel speed indicative signals $v_w$, are cyclically or periodically converted into digital wheel speed indicative data Vw by the A/D converter in the input interface to be processed in the anti-skid control unit 63.

Figure 4:
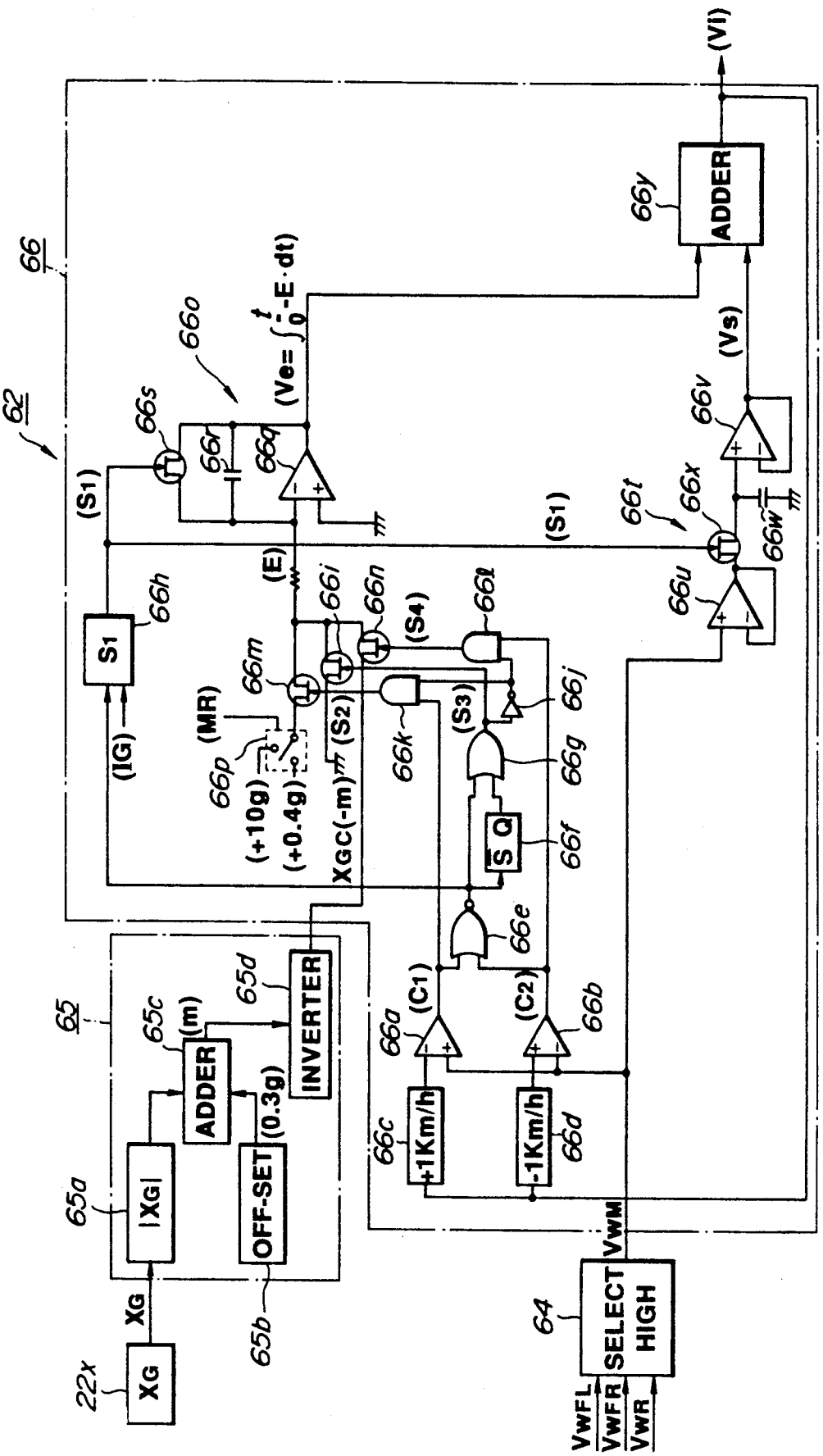
FIG. 4 is a block diagram of the preferred construction of the vehicle speed data projecting circuit in FIG. 2.

FIG. 4 shows the detailed construction of the vehicle speed representing value projecting circuit 62. As set forth above, the vehicle speed representing value projecting circuit 62 derives a vehicle speed representing value Vi based on the wheel speeds $Vw_{FL}$, $Vw_{FR}$ and $Vw_R$ as indicated in the wheel speed indicative signals from the wheel speed derivation circuit 41FL, 41FR and 41R. The vehicle speed representing value projecting circuit 62 includes comparators 66a and 66b. The comparator 66a has a non-inverting input terminal connected to the wheel speed derivation circuits 41FL, 41FR and 41R via a select HIGH circuit 64. On the other hand, the comparator 66b is connected through the select HIGH circuit 64 to the wheel speed derivation circuits 41FL, 41FR and 41R at an inverting input terminal. An inverting input terminal of the comparator 66a is connected to output terminal of the vehicle speed representing value projecting circuit 62 through which the vehicle speed representing value Vi is output, through an adder 66c. On the other hand, the non-inverting input terminal of the comparator 66b is connected to the output terminal of the vehicle speed representing value projecting circuit 62 through a subtractor 66d. The adder 66c is designed to add a given value corresponding to 1 km/h of vehicle speed to the vehicle speed representing value Vi for providing dead band of +1 km/h. The value as the sum of the vehicle speed representing value Vi and the dead band value 1 km/h will be hereafter referred to as "higher vehicle speed reference value (Vi+1 km/h)". Similarly, the subtractor 66d subtracts a given value corresponding to 1 km/h of the vehicle speed from the vehicle speed representing value Vi for providing dead band of −1 km/h. The value as the sum of the vehicle speed representing value Vi and the dead band value −1 km/h will be hereafter referred to as "lower vehicle speed reference value (Vi−1 km/h)". The select HIGH circuit 64 selects the highest value between the three wheel speeds $Vw_{FL}$, $Vw_{FR}$, and $Vw_R$, and outputs a select HIGH input $Vw_M$. The comparator 66a outputs HIGH level comparator signal when the select HIGH input $Vw_M$ is higher than or equal to the higher vehicle speed reference value (Vi+1 km/h). In other words, the comparator signal level of the comparator 66a is held LOW as long as the select HIGH input $Vw_M$ is maintained higher than the lower vehicle speed reference value (Vi+1 km/h). The comparator 66b outputs HIGH level comparator signal when the select HIGH input $Vw_M$ is lower than to the lower vehicle speed reference value (Vi−1 km/h). In other words, the comparator signal level of the comparator 66b is held LOW as long as the wheel speed $Vw_{FL}$, $Vw_{FR}$ or $Vw_R$ is maintained higher than or equal to the lower vehicle speed reference value (Vi−1 km/h).

The output terminals of the comparators 66a and 66b are connected to input terminals of NOR gate 66e to feed the comparator signals $C_1$ and $C_2$ thereto. The NOR gate 66e outputs HIGH level gate signal while signal levels of both of the comparator signals $C_1$ and $C_2$ are maintained LOW. Namely, the gate signal output from the NOR gate 66e is held HIGH while the select HIGH input $Vw_M$ of the wheel speed $Vw_{FL}$, $Vw_{FR}$ or $Vw_R$ is maintained higher than or equal to the lower vehicle speed reference value (Vi−1 km/h) and lower than the higher vehicle speed reference value (Vi+1 km/h). The gate signal of the NOR gate 66e is fed to a timer 66f, an OR gate 66g and a shot-pulse generator 66h, respectively. The timer 66f is responsive to the trailing edge of the HIGH level NOR gate signal to output a timer signal for a given period of time $T_3$, e.g. 0.1 sec. The timer signal is fed to the OR gate 66g.

The OR gate 66g thus receives the NOR gate signal at one input terminal and the timer signal from the timer 66f at the other input terminal. An OR gate signal of the OR gate 66f is transmitted to a gate of an analog switch 66i as a selector signal $S_3$. The output terminal of the OR gate 66g is also connected to one input terminal of an AND gates 66k and 66l via an inverter 66j. The other input terminal of the AND gate 66k is connected to the output terminal of the comparator 66a to receive therefrom the comparator signal $C_1$. Similarly, the other input terminal of the AND gate 66l is connected to the output terminal of the comparator 66b to receive the comparator signal $C_2$ therefrom. Therefore, the gate signal $S_2$ of the AND gate 66k becomes HIGH while the comparator signal $C_1$ is maintained at HIGH level and the NOR gate signal is held LOW. The gate signal $S_2$ serves as a selector signal. On the other hand, the gate signal $S_4$ of the AND gate 66l becomes HIGH level while the comparator signal $C_2$ is maintained HIGH and the NOR gate signal is held LOW. This gate signal $S_4$ also serves as selector signal. The AND gates 66k and 66l are connected to gates of analog switches 66m and 66n.

The analog switch 66i is turned ON in response to HIGH level selector signal $S_3$ to drop the supply voltage to an integrator circuit 66o to zero. On the other hand, the analog switch 66m is turned ON in response to the HIGH level selector signal $S_2$ to supply a voltage E corresponding to a possible maximum longitudinal acceleration, e.g. 0.4 G, to the integrator circuit 66o. The analog switch 66n is connected to a correction circuit 65 which is designed for correcting the longitudinal acceleration indicative signal value $X_G$. The analog switch 66n is likewise turned ON in response to the HIGH level selector signal $S_4$ to supply a voltage corresponding to possible minimum wheel acceleration value to the integrator circuit 66o.

The correction circuit 65 includes an absolute value circuit 65a connected to the longitudinal acceleration sensor 22X to receive therefrom the longitudinal acceleration indicative signal $X_G$ and output absolute value signal representative of the absolute value $|X_G|$ of the longitudinal acceleration indicative signal. The absolute value signal of the absolute value circuit 65a is input to an adder 65c. The adder 65c also receives an offset value, for example 0.3 g, from an offset value generator circuit 65b. The adder output m is supplied to the analog switch 66n via an inverter 65d to provide the corrected longitudinal acceleration indicative signal $X_{GC}$ corresponding to an inverted value −m of the sum of the absolute value $|X_G|$ and the offset value (0.3 g). The inverted value −m corresponds to a deceleration of the wheel speed.

The integrator circuit 66o has a per se well known construction and is consisted of an amplifier 66q, a capacitor 66r and an analog switch 66s. The gate of the analog switch 66s is connected to the shot-pulse generator 66h to receive therefrom a shot-pulse which serves as a reset signal $S_1$. The integrator 66o is reset by the HIGH level reset signal $S_1$ and is responsive to the trailing edge of the HIGH level reset signal to reset the integrated value. The integrator circuit 66o integrates the supply voltage E after termination of the HIGH level reset signal $S_1$ to output the integrator signal. The shot-pulse generator 66h is responsive to an ON-set signal IG of an ignition switch to generate a first shot pulse as the first reset signal for resetting the integrator circuit 66o. The shot-pulse generator 66h subsequently generate the shot-pulses serving as the reset signal $S_1$ at every leading edge of the HIGH level NOR gate signal. As set forth above, since the NOR gate signal becomes HIGH when the select HIGH input of the wheel speeds $Vw_{FL}$, $Vw_{FR}$ and $Vw_R$ satisfies (Vi−1 km/h)<=V-$w_M$<(Vi+1 km/h), the integrated value of the integrator 66o is reset every occurrence of the select HIGH input $Vw_M$ in the aforementioned range. The reset signal $S_1$ of the shot-pulse generator 66h is also supplied to a sample hold circuit 66t. The sample hold circuit 66t comprises a buffer amplifiers 66u and 66v, a capacitor 66w and an analog switch 66x. The analog switch 66x is connected to the shot-pulse generator 66h to receive the reset signal $S_1$ at the gate thereof to be turned ON. The sample hold circuit 66t is responsive to turning ON of the analog switch 66x to reset the held wheel speed value. The sample hold circuit 66t in absence of the reset signal $S_1$ from the shot-pulse generator 66h, samples and holds the instantaneous select HIGH input $Vw_M$ at the occurrence of the reset signal as a sample value Vs. The sample hold circuit 66t outputs a sample/hold signal having a value indicative of the sample value Vs to an adder 66y. The adder 66y receives the sample/hold signal from the sample hold circuit 66t and integrator signal from the integrator 66o. As will be appreciated, the integrator signal has a value indicative of an integrated value Ve $$\left( = \int_{t}^{0} (-E) \cdot dt \right).$$

Therefore, the adder 66y adds the integrated value Ve to the sample value Vs to derive the vehicle speed representing value Vi. The output terminal of the adder 66y is connected to the anti-skid control unit 63.

FIG. 5 shows a skid cycle control routine for controlling the skid control cycle generally according to the schedule set forth in the general discussion of the process of anti-skid brake control.

Immediately after starting execution, at step 1002, each wheel speed indicative data Vwi (i=FL, FR, and R) is read out. At a step 1004, the wheel acceleration indicative data $\alpha$ is derived on the basis of the wheel speed indicative data Vwi. At a step 1006, the vehicle speed representing value Vi is read out. At a step 1008, the wheel slippage Si is derived according to the following equation:

$$Si = \{(Vi - Vwi)/Vi\} \times 100(\%)$$

The wheel slippage Si is compared with a predetermined wheel slippage threshold $S_0$ at a step 1010. The wheel slippage threshold $S_0$ may be set at about the optimum wheel slippage range where an optimum vehicle braking efficiency can be obtained. In the shown embodiment, the wheel slippage threshold $S_0$ is set at 15%.

The shown embodiment performs APPLICATION mode operation in mutually different two way modes. The braking pressure increases linearly according to increasing of the fluid pressure built up in the master cylinder 42. Such operational mode will be hereafter referred to as "NORMAL APPLICATION mode". The pressure control valve is operated alternatively to the APPLICATION mode position and HOLD mode position for increasing the braking pressure in stepwise fashion. This operation mode will be hereafter referred to as "CONTROLLED APPLICATION mode". The CONTROLLED APPLICATION mode is introduced in order to lower increasing speed of the braking pressure in the wheel cylinder so that the braking pressure is held at a level close to a pressure where the optimum wheel slippage is obtained and hereafter referred to as "lock pressure", for an expanded period.

At the initial stage of the braking operation, wheel slippage Si is held smaller than that wheel slippage threshold $S_0$. Therefore, the answer at the step 1010 at the initial braking state becomes negative. Then, at a step 1012, check is performed whether a RELEASE mode timer value L of a RELEASE mode timer (not shown but facilitated in the arithmetic circuit of the microprocessor) is greater than zero or not. At this time, the RELEASE mode timer value L is maintained at zero, the answer at the step 1012 also becomes negative. Then, at a step 1014, judgement is made that the condition satisfies a predetermined skid control terminating condition.

In the practical embodiment, the skid control terminating conditions are set as follows:

when the vehicle speed representing value Vi is smaller than or equal to a vehicle body stopping state indicative reference value;

when number of occurrence of switching of the pressure control valve mode position in the CONTROLLED APPLICATION mode becomes greater than or equal to a predetermined value; and when the brake switch is turned OFF.

When the skid control terminating condition is satisfied as checked at the step 1014, the RELEASE mode timer value L is cleared and a skid control state indicative period flag AS is reset at a step 1016. At a step 1018, the NORMAL APPLICATION mode skid control cycle period is commanded. Thereafter, process goes END.

If the skid control terminating condition as checked at the step 1014 is not satisfied, the RELEASE mode timer value L is again checked at a step 1020. When the RELEASE mode timer value L is smaller than or equal to zero as checked at the step 1020, the wheel acceleration $\alpha$ is compared with a predetermined acceleration threshold $+\alpha_1$ at a step 1022. If the acceleration as checked at the step 1022 is greater than or equal to the wheel acceleration threshold $+\alpha_1$, it means that the wheel is not yet decelerated after initiation of increasing of the braking pressure or wheel is acceleration during RELEASE mode cycle period. Therefore, in order to discriminate the instantaneous status of the braking condition, check is performed whether the skid control state indicative flag As is set at a step 1024. When the skid control state indicative flag AS is not set as checked at a step 1024, then process goes to the process through the step 1018 for setting the operation mode to the NORMAL APPLICATION mode.

On the other hand, when the skid control state indicative flag AS is set as checked at the step 1024, then judgement is made that it is the timing to switch the skid control cycle from the RELEASE mode cycle period to the HOLD mode cycle period because the wheel acceleration $\alpha$ is held greater than the wheel acceleration threshold $+\alpha_1$ and the operational mode is held in the RELEASE mode. Then, HOLD mode cycle period is commanded at a step 1026. After commanding the HOLD mode cycle period, the process goes END.

On the other hand, when the wheel acceleration $\alpha$ as compared with the wheel acceleration threshold $+\alpha_1$ at the step 1022, is smaller than the acceleration threshold $+\alpha_1$, then the wheel acceleration $\alpha$ is checked with a predetermined wheel deceleration threshold $-\alpha_2$ at a step 1028. When the wheel acceleration $\alpha$ as checked at the step 1028 is smaller than the wheel deceleration threshold $-\alpha_2$, it means that the braking condition requires anti-skid control. Then, at the step 1026, the HOLD mode cycle period is commanded for placing the pressure control valve 16 at the HOLD mode position.

If the wheel acceleration $\alpha$ as compared with the wheel deceleration threshold $-\alpha_2$ at the step 1028 is greater than the wheel deceleration threshold, the skid control state indicative flag AS is checked at a step 1030. If the skid control mode indicative flag AS is not set as checked at the step 1030, process goes to the step 1018. On the other hand, when the skid control state indicative flag AS is set as checked at the step 1030, the CONTROLLED APPLICATION mode cycle period is commanded at a step 1032.

On the other hand, when wheel slippage Si as checked at the step 1010 is greater than or equal to the wheel slippage threshold $S_0$, then the wheel acceleration $\alpha$ is compared with the wheel acceleration threshold $+\alpha_1$ at a step 1034. When the wheel acceleration $\alpha$ as checked at the step 1034 is greater than or equal to the wheel acceleration threshold $+\alpha_1$, judgement can be made that the condition does not satisfy to perform the RELEASE mode skid control cycle period operation. Therefore, the RELEASE mode timer value L is cleared at a step 1036. On the other hand, when the wheel acceleration $\alpha$ as checked at the step 1034 is smaller than the wheel acceleration threshold $+\alpha_1$, judgement can be made that a condition for performing the RELEASE mode skid control mode cycle period is satisfied. Therefore, at a step 1038, the RELEASE mode timer value L is set at a predetermined initial timer value $L_0$ which represents a period to maintain RELEASE mode skid control cycle period after the wheel slippage Si is decreased across the wheel slippage threshold $S_0$. At the same time, the skid control state indicative flag AS is set to '1'.

When the RELEASE mode timer value L as checked at the step 1012 is greater than zero (0), then, the RELEASE mode timer value L is decremented by one (1) at a step 1040 and thereafter process moves to the step 1014. When the RELEASE mode timer value L as decremented at the step 1040 is still held greater than zero (0), the answer at the step 1020 becomes positive since the RELEASE mode timer value is greater than zero. Then, process goes to a step 1042 to command the RELEASE mode skid control cycle period.

As seen from FIGS. 1 and 2, the vehicle speed representative value projecting circuit 62 is also connected to the steering control unit 31 in order to provide the projected vehicle speed representative value Vi as vehicle body speed representative data for control operation of the steering angle.

Figure 7:
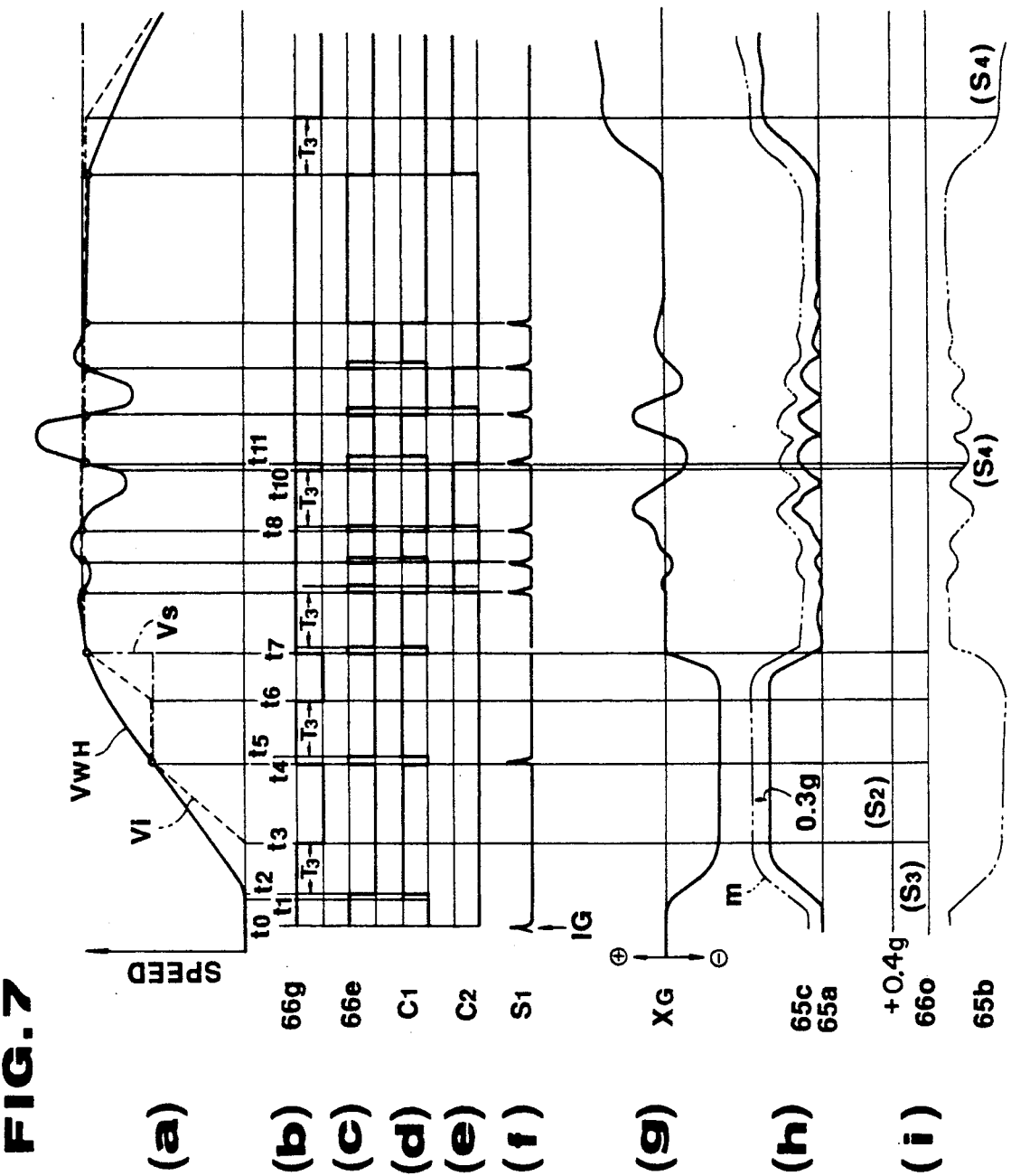
FIG. 7 is a timing chart showing operation of the vehicle speed data projecting circuit of FIG. 3.

In the operation, assuming that the vehicle is now in parking state and the engine 1 is not running, power supply for the steering control unit 31 and the anti-skid brake control unit 29 are held shut-down. In response to turning ON the key switch to drive the engine, power supply for the steering control unit 31 and the anti-skid brake control system is initiated. At this time, since the longitudinal acceleration indicative input from the longitudinal acceleration sensor 22X is held zero (0) as shown in FIG. 7(g), therefor, the output m of the adder circuit 65c of the correction circuit 65 becomes a value only containing given offset value 0.3 g, as illustrated by phantom line in FIG. 7(h). Therefore, the input for the vehicle speed representative value projecting circuit 62 from the inverter circuit 65d becomes the inverted value ($-m$) of the adder output m, as shown in FIG. 7(i).

Assuming that the ignition switch is subsequently turned on at a time $t_0$, the ON set signal IG of the ignition switch is supplied to the shot pulse generator 66h. The shot-pulse generator 66h is responsive to the ON set signal IG for outputting the HIGH level reset signal $S_1$, as shown in FIG. 7(f). The HIGH level rest signal $S_1$ is supplied to the sample/hold circuit 66t for resetting the latter. At this time, the select HIGH input $Vw_M$ from the select HIGH circuit 64 is maintained zero (0), as shown by broken line in FIG. 7(a). Also, the HIGH level reset signal $S_1$ is also supplied to the integrator circuit 66o for resetting the latter. Therefore, the integrator output Ve also becomes zero (0). As a result, the sample value Vs of the sample/hold circuit 66t becomes zero (0).

At this time, since both of the projected vehicle speed representative value Vi and the select HIGH input $Vw_M$ are zero (0), the outputs $C_1$ and $C_2$ of the comparators 66a and 66b are both held LOW level, as shown in FIGS. 7(d) and 7(e). In response to these LOW level comparator outputs $C_1$ and $C_2$ from the comparators 66a and 66b, HIGH level gate signal is output from the NOR gate 66e as shown in FIG. 7(c). Accordingly, the select signal $S_3$ of the OR gate 66g is held HIGH level. The select signal $S_3$ is fed to the analog switch 66i to turn the latter ON. The select signal $S_3$ is also fed to the AND gates 66k and 66l via the inverter 66j. Therefore, the inputs for the AND gates 66k and 66l through the inverter 66j are maintained at LOW level. This disables the AND gates 66k and 66l from generating select signals $S_2$ and $S_4$. At the same time, since the input of the analog switch 66i is grounded, the input voltage E from the integrator circuit 66o is maintained at zero (0) as illustrated by solid line in FIG. 7(i). At this time, the projected vehicle speed representative value Vi as derived by the adder circuit 66y and as a sum value of the integrator output Ve of the integrator circuit 66o and the sample value Vs of the sample/hold circuit 66t.

At a time $t_1$, vehicle starts to run. During vehicular acceleration state, the select HIGH input $Vw_M$ from the select HIGH circuit 64 increases as illustrated by solid line in FIG. 7(a). If the select HIGH input $Vw_M$ becomes greater than or equal to (Vi+1 km/h) at a time $t_2$, the comparator output $C_1$ of the comparator 66a turns into HIGH level. At this time, the output of the OFF delay timer 66f is maintained at HIGH level for a predetermined period $T_3$ from the time $t_2$. Therefore, the select signal $S_3$ of the OR gate 66g is maintained HIGH level for the period $T_3$. During this period $T_3$, the projected vehicle speed representative value Vi output from the adder 66y is maintained at zero (0). At a time $t_3$ where the predetermined period $T_3$ from the time $t_2$ expires, the level of the select signal $S_3$ of the OR gate 66g turns into LOW level. In response to the trailing edge of the HIGH level select signal $S_3$ as the signal level turned from HIGH level to LOW level at the time $t_3$, the analog switch 66i turns OFF. At the same time, in response to HIGH level input via the inverter 66j, the analog switch 66m turns ON. Then, the preset value corresponding to a predetermined acceleration magnitude, e.g. +0.4 g, is fed to the integrator circuit 66o via the conductive state analog switch 66m. Therefore, the integrated value Ve increases according to expiration of time. The integrated value Ve is then added with the sampled value Vs from the sample/hold circuit 66t to increase the projected vehicle speed representative value Vi as illustrated by broken line in FIG. 7(a).

When the projected vehicle speed representative value Vi becomes equal to the select HIGH input $Vw_M$ from the select HIGH circuit 64 at a time $t_4$, the comparator output $C_1$ of the comparator 66a turns LOW level to cause HIGH level gate output of the NOR gate 66e. In response to this, the integrator circuit 66o is reset and the analog switch 66i turns ON. By resetting, the integrator output Ve becomes zero (0). At the same time, the sample/hold circuit 66t is reset to hold the instantaneous select HIGH input $Vw_M$ at the time $t_4$. Since the vehicle is still in the acceleration state, the select HIGH input $Vw_M$ becomes greater than the projected vehicle speed $V_i$. The comparator output $C_1$ of the comparator 66a again turns into HIGH level. Therefore, at a time $t_6$ after expiration of the predetermined period $T_3$ from the time $t_5$, the analog switch 66m turns ON. Therefore, the projected vehicle speed representative value $V_i$ is increased at a rate corresponding to the predetermined value representative of 0.4G. By this the projected vehicle speed representative value $V_i$ again becomes equal to the select HIGH input $Vw_M$ at a time $t_7$, then the integrator circuit 66o and the sample/hold circuit 66t are reset in the same process as that performed at the time $t_4$.

Assuming that the vehicle speed V is held constant during the period between the time $t_7$ and a time $t_8$, the select HIGH input $Vw_M$ fluctuates at intervals shorter than the predetermined period $T_3$. As a result, the output level of the OR gate 66g is maintained at HIGH level by the HIGH level input from the OFF delay timer 66f despite of repeated variation of the output level of the NOR gate 66e. Therefore, the integrator output Ve of the integrator circuit 66o is maintained at zero (0). The output of the adder circuit 66y as the projected vehicle speed representative value $V_i$ is maintained at a value corresponding to the sampled value Vs as sampled by the sample/hold circuit 66t at the time $t_7$.

At a time $t_9$ (not shown) after short period of the time $t_8$, the select HIGH input $Vw_M$ becomes smaller than $(V_i - 1$ km/h). In response to this, the gate signal of the NOR gate 66e drops to LOW level and maintained at LOW level even after a time $t_{10}$ at which the predetermined period $T_3$ expires. At this time, since the select HIGH input $Vw_M$ is smaller than $(V_i - 1$ km/h), the comparator output $C_2$ of the comparator 66b turns into HIGH level. As a result, the select signal $S_4$ of the AND gate 66l becomes HIGH level to turn the analog switch 66n ON. Therefore, the output $X_{GC}(-m)$ of the correction circuit 65 is supplied to the integrated circuit 66o for varying the input voltage E as illustrated in FIG. 7(i). As a result, the integrator output Ve of the integrator circuit 66o is decreased at a rate of $-m$. Therefore, the projected vehicle speed representative value $V_i$ as the sum of the sample value Vs of the sample/hold circuit 66t and the integrated value Ve of the integrator circuit 66o is decreased at the rate of $-m$.

At a time $t_{11}$, the projected vehicle speed representative value $V_i$ becomes substantially equal to the select HIGH input $Vw_M$. Therefore, the comparator output $C_2$ of the comparator 66b turns into LOW level. Simultaneously, the output of the NOR gate 66e turns into HIGH level. In response to this, the integrator circuit 66o and the sample/hold circuit 66t are reset. By this, the sample/hold circuit 66t holds the instantaneous select HIGH input $Vw_M$ at the time $t_{11}$. After the time $t_{11}$, the vehicle speed becomes substantially constant so that the select HIGH input $Vw_M$ fluctuates with intervals shorter than the predetermined period $T_3$. Therefore, similarly to that during the period $t_7$ to $t_8$, the projected vehicle speed representative value $V_i$ is maintained at the value corresponding to the sample value Vs of the sample/hold circuit 66t.

Figure 8:
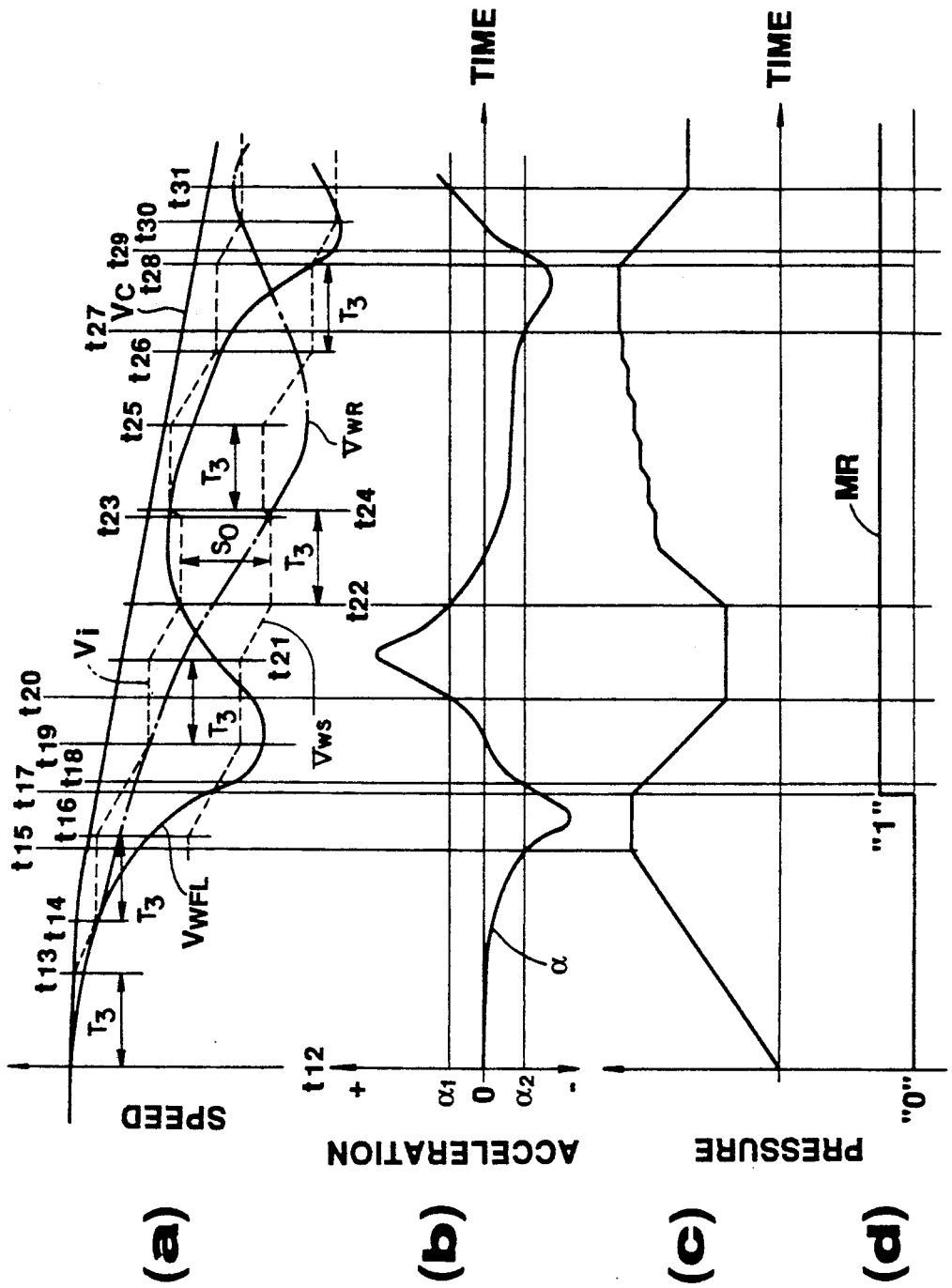
FIG. 8 is a timing chart showing operation of the anti-skid brake control system of FIG. 2.

Assuming braking operation is initiated by depression of the brake pedal at a time $t_{12}$ of FIG. 8, vehicle enters into deceleration state. Unless the anti-skid control becomes active, the pressure control valve 71 is held in the APPLICATION mode position for permitting the braking pressure in the wheel cylinders 70FL, 70FR, 70RL and 70RR to be increased according to increasing of the fluid pressure built up in the master cylinder. During this period, the braking pressure in the wheel cylinders is increased as shown in FIG. 8(c). Accordingly, the wheel speed $Vw_{FL}$, $Vw_{FR}$ and $Vw_R$ is decreased.

At this time, in the shown embodiment, the front wheels are driven wheels and rear wheels are driving wheels. Therefore, due to difference of inertia moment, the deceleration rate of the front wheels $Vw_{FL}$ and $Vw_{FR}$ becomes much greater than that of the rear wheels $Vw_R$ which is illustrated by phantom line in FIG. 8(a). According to lowering of the select HIGH input $Vw_M$ from the time $t_{12}$, the comparator output $C_2$ of the comparator 66b turns into HIGH level. According to this, the gate output of the OR gate 66g turns into LOW level at a time $t_{13}$ after expiration of the predetermined period $T_3$ from the time $t_{12}$. The analog switch 66n is thus turned ON. Therefore, the input voltage E is set to the deceleration $-m$. Accordingly, the integrated value Ve is decreased at the rate of $-m$. By this, the projected vehicle speed representative value $V_i$ is decreased as illustrated in FIG. 8(a). Subsequently, at a time $t_{14}$, the projected vehicle speed representative value $V_i$ becomes substantially equal to the select HIGH input $Vw_M$, the integrated circuit 66o and the sample/hold circuit 66t are reset. Then, the instantaneous select HIGH input $Vw_M$ at the time $t_{14}$ is held in the sample/hold circuit 66t. Therefore, the sample value Vs is set constant at a value corresponding to the select HIGH input $Vw_M$ as sampled at the time $t_{14}$.

After expiration of the predetermined period $T_3$ at a time $t_{16}$, the analog switch 66n is again turned ON. Therefore, the projected vehicle speed representative value $V_i$ is decreased at the rate of $-m$. When the projected vehicle speed representing value $V_i$ becomes substantially equal to the select HIGH input $Vw_M$ corresponding to the highest value between the wheel speeds $Vw_{FL}$, $Vw_{FR}$, and $Vw_R$ at a time $t_{19}$, the integrator circuit 66o and the sample/hold circuit 66t are reset to hold the instantaneous select HIGH input $Vw_M$. Therefore, after the time $t_{19}$, the sample value Vs is held constant at a value corresponding to the instantaneous select HIGH input $Vw_M$ sampled at the time $t_{19}$. Subsequently, from a time $t_{21}$, the projected vehicle speed representative value is decreased at a rate of $-m$. During a period between times $t_{22}$ to $t_{23}$, the projected vehicle speed representative value $V_i$ is held constant at a value corresponding to the select HIGH input $Vw_M$ held at the time $t_{22}$. During this period between the times $t_{22}$ and $t_{23}$, since the select HIGH input $Vw_M$ $(Vw_{FL})$ becomes greater than or equal to $(V_i + 1)$, the output of the OR gate 66g turns into LOW level upon expiration of the predetermined time $T_3$. At this time, the analog switch 66m turns ON.

During the braking period set forth above, the anti-skid brake control unit 29 is active to perform anti-skid brake control. Therefore, HIGH level MR signal is supplied from the anti-skid control circuit 63 to a switch 66p for switching acceleration increasing rate representative value from +0.4G to +10G to be supplied to the integrator circuit 66o as the input voltage E. When the switch 66p receives the HIGH level MR signal, the acceleration gradient is set to +10 g. While the switch 66p receives the LOW level MR signal, the acceleration is set to +4 g. Therefore, during the period between times $t_{23}$ and $t_{24}$, the integrated value Ve increases rapidly at the rate corresponding to +10G. When the projected vehicle speed representative data Vi becomes equal to the select HIGH input $Vw_M (Vw_{FL})$ at a time $t_{24}$, the sample value Vs is held constant at a value corresponding to that held at the time $t_{24}$ until a time $t_{25}$, at which the predetermined period $T_3$ expires.

After the time $t_{25}$, the projected vehicle speed representative value Vi at the deceleration $-m$ until a time $t_{26}$, and during the period between times $t_{26}$ to $t_{28}$, the sampled value Vs is held constant at a value corresponding to that held at the time $t_{26}$, since the projected vehicle speed representative data Vi is substantially equal to the select HIGH input $Vw_M$, that is, $Vi-1 \leq Vw_M < Vi+1$. This cycle is repeated during period from $t_{28}$ to $t_{30}$ and after $t_{30}$.

In the period from $t_{12}$ to $t_{31}$, anti-skid control is performed according to the following schedule.

At the time $t_{12}$, the pressure control valve unit 71 is maintained at the APPLICATION mode position upon initiation of the braking operation which is triggered by depression of the brake pedal 41. By application of the braking force to the brake pedal, working fluid pressure is built up in the master cylinder 42, since the pressure control valve unit 71 is held at the APPLICATION mode position, the braking pressure in the wheel cylinder 70 is increased linearly in proportion to increasing of the working fluid pressure to decelerate the wheel speed. By increasing of the braking pressure, wheel deceleration $-\alpha$ (negative value of wheel acceleration) increases and becomes greater than a predetermined deceleration threshold $-\alpha_2$ at a time $t_{15}$, the anti-skid control unit 63 is responsive to the wheel deceleration increased across the deceleration threshold to initiate skid control cycle, upon which the skid control cycle enters into HOLD mode cycle period to place the pressure control valve unit 71 at the HOLD mode position to maintain the increased level of braking pressure constant. In FIG. 8(a), the uppermost broken line represents the projected vehicle speed representing value Vi, while the lowermost broken line parallel to the uppermost broken line Vi represents a value Vws of 85% of the vehicle speed value Vi, that is, a wheel speed value occurring in a predetermined slippage threshold $S_o$ of 15%. By holding the increase level of braking pressure in the HOLD mode position of the pressure control valve unit 71, wheel is decelerated to increase wheel slippage across a predetermined wheel slippage threshold as illustrated by broken line in FIG. 8, at a time $t_{17}$, the anti-skid control unit 63 is responsive to increasing of the wheel slippage increasing across the wheel slippage threshold to terminal the HOLD mode cycle period and trigger RELEASE mode cycle period, in which the pressure control valve unit 71 is placed in the RELEASE mode position to decrease braking pressure in the wheel cylinder 70. By maintaining the pressure control valve unit 71 in the RELEASE mode position, braking pressure is reduced and thus wheel is accelerated to result in increasing of wheel acceleration $+\alpha$ across a predetermined wheel acceleration threshold $+\alpha_1$ at a time $t_{20}$, the anti-skid control unit 63 is responsive to increasing of the wheel acceleration $+\alpha$ across the wheel acceleration threshold $+\alpha_1$ to terminate the RELEASE mode cycle period and trigger a HOLD mode cycle period to switch the position of the pressure control valve unit 71 from the RELEASE mode position to the HOLD mode position in order to hold the braking pressure at the lowered level. By maintaining the pressure control valve unit 71 at the HOLD mode, wheel speed is resumed and increased across the vehicle body speed and subsequently return to the speed corresponding to the vehicle body speed at a time $t_{22}$, the anti-skid control unit 63 is responsive to the wheel speed once increased across the vehicle body speed and subsequently return to the vehicle body speed to terminate HOLD mode cycle period and trigger controlled APPLICATION mode cycle period.

The process of anti-skid brake control has been disclosed in the following U.S. Pat. Nos.

4,408,290, issued on Oct. 4, 1983
4,674,049, issued on June 16, 1987
4,704,684, issued on Nov. 3, 1987
4,663,715, issued on May 5, 1987
4,663,716, issued on May 5, 1987
4,660,146, issued on Apr. 21, 1987
4,665,491, issued on May 12, 1987
4,780,818, issued on Oct. 25, 1988
4,674,050, issued on June 16, 1987
4,680,714, issued on July 14, 1987
4,682,295, issued on July 21, 1987
4,680,713, issued on July 14, 1987
4,669,046, issued on May 26, 1987
4,669,045, issued on May 26, 1987
4,679,146, issued on July 7, 1987
4,656,588, issued on Apr. 7, 1987
4,718,013, issued on Jan. 5, 1988
4,569,560, issued on Feb. 11, 1986
4,662,686, issued on May 5, 1987
4,667,176, issued on May 19, 1987
4,597,052, issued on June 24, 1986
4,637,663, issued on Jan. 20, 1987
4,683,537, issued on July 28, 1987

The disclosure of the above-identified United States Patents will be herein incorporated by reference for the sake of disclosure.

Figure 9:
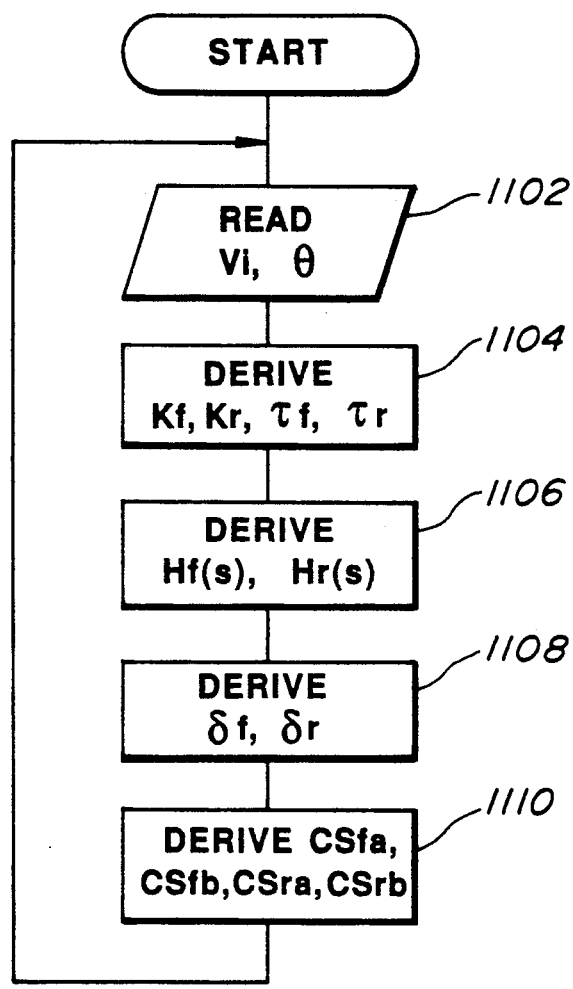
FIG. 9 is a flowchart showing the preferred process of operation of the four wheel steering control system according to the present invention.

On the other hand, the steering control unit 31 performs control operation for the primary and subsidiary steerable wheels according to the process as illustrated in FIG. 9 in a form of a flowchart.

In the shown process, the steering angle indicative signal $\theta$ and the projected vehicle speed representative value Vi are read out at a step 1102. Based on the projected vehicle speed representative value Vi, the proportional constant Kf and Kr, and the differentiation coefficient $\tau f$ and $\tau r$ are calculated utilizing the foregoing equations (1), (2) and (3) at a step 1104. Subsequently, at a step 1106, the front and rear wheel transfer functions Hf(s) and Hr(s) are derived on the basis of the proportional constant Kf and Kr and the differentiation coefficient $\tau f$ and $\tau r$ utilizing the equations (4) and (5). Based on the transfer functions Hf(s) and Hr(s) derived at the step 1106, the front wheel toe angle command value $\delta f$ and the rear wheel toe angle command value $\delta r$ are derived according to the equations (6) and (7) set forth above at a step 1108. Then, at a step 1110, steering control signals $CS_{fa}$, $CS_{fb}$, $CS_{ra}$ and $CS_{rb}$ are derived on the basis of the instantaneous front and rear toe angle indicative values $\delta F$ and $\delta R$ read out from the front and rear stroke sensors 33 and 34 and the front and rear wheel toe angle command value $\delta f$ and $\delta r$.

Practically, differences $\Delta \delta F$ ($= \delta F - \delta f$) and $\Delta \delta R$ ($= \delta R - \delta r$) are derived. The steering control signals $CS_{fa}$, $CS_{fb}$, $CS_{ra}$ and $CS_{rb}$ are derived on the basis of the differences $\Delta \delta F$ and $\Delta \delta R$. Namely, when the differences $\Delta \delta F$ and $\Delta \delta R$ are zero, the control signals $CS_{fa}$, $CS_{fb}$, $CS_{ra}$ and $CS_{rb}$ are set at a logical zero (LOW). On the other hand, when the differences $\Delta \delta F$ and $\Delta \delta R$ are greater than zero, then, the control signals $CS_{fa}$ and $CS_{fa}$ are set at a value of logical one (HIGH) and the control signals $CS_{fb}$ and $CS_{fb}$ are set at a value of logical zero. On the other hand, when the differences $\Delta\delta F$ and $\Delta\delta R$ are smaller than zero, then, the control signals $CS_{fa}$ and $CS_{ra}$ are set at a value of logical zero and the control signals $CS_{fb}$ and $CS_{rb}$ are set at a value of logical one. By doing this, the servo valves 20f and 20r are controlled for controlling operational magnitude of the cylinders 7 and 9 and whereby an optimal feedback control is performed for the toe angles of the front and rear wheels. As can be appreciated, since the present invention utilizing the projected vehicle speed representative value in place of the vehicle speed, precise steering control can be performed irrespective of variation of the actual wheel speed which is caused by anti-skid brake control operation for example.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

It should be appreciated that the present invention is applicable for various types of four wheel steering control systems. For example, the present invention is applicable for the steering control systems disclosed in the co-pending U.S. patent applications Ser. Nos. 195,085, filed on May 17, 1988, 284,414, filed on Dec. 14, 1988 and 277,745, filed on Nov. 30, 1988, all of which have been assigned to the common assignee to the present invention. The disclosure of above references co-pending U.S. Patent Applications are herein incorporated by reference. Furthermore, though the shown embodiment employs both of the proportional element and advance element, the invention may be applicable for the steering control system which only employs proportional element as control factor such as that disclosed in the Japanese Patent First Publication (Tokkai) Showa 57-11173. Also, the present invention is applicable for the steering control system which derives the target rear wheel toe angle on the basis of the vehicle speed representative data and the front wheel steering angle such as that disclosed in the Japanese Patent First Publication (Tokkai) Showa 59-143770. Furthermore, though the shown embodiment employs the closed center type servo valves for controlling operation of the cylinders, these valves may be replaced with an open center type servo valves. In such case, return spring may be employed for returning the piston in the cylinder to the neutral position.

Also, though the shown embodiment is directed to the subsidiary wheel steering system employing the cylinder to control toe angle of the subsidiary steerable wheel, various constructions of subsidiary wheel toe angle control mechanism can be employed. For example, the subsidiary wheel toe angle control mechanism may comprises a lateral rod and a hydraulic cylinder disposed at the intermediate portion of the lateral rod.

Although the shown embodiment is directed to a four wheel steering system employing front and rear assistant steering mechanisms, respectively, including front and rear power assist cylinders, an improved steering control system according to the invention may be applicable for a steering system employing at least one assistant steering mechanism. In addition, though the specific type of anti-skid brake control system has been discussed in the shown embodiment, the invention is applicable for various constructions of the anti-skid brake control systems. For example, though the shown embodiment derives the projected vehicle speed representative value on the basis of the wheel speed, it may be possible to derive the essentially equivalent vehicle speed representative data by integrating longitudinal acceleration. Additionally, though the shown embodiment has been directed to the combination of the fourth wheel steering control system and the anti-skid brake control system, the invention may be also applicable for a combination of the four wheel steering system and a traction control system such as that disclosed in the U.S. Pat. No. 4,763,912, issued on Aug. 16, 1988.

What is claimed is:

1. A four wheel steering control system for an automotive vehicle which includes a primary steerable wheel turned by a manually operable vehicular steering mechanism, and a subsidiary steerable wheel, said control system comprising:

a subsidiary wheel toe control mechanism operatingly connected to said subsidiary steerable wheel for controlling a toe angle according to a subsidiary wheel steering control signal, said subsidiary wheel toe control mechanism including a power assist cylinder for generating assistant force so as to turn said subsidiary wheel;

a steering wheel angle sensing means disposed adjacent to said manually operable steering mechanism for producing a steering wheel angle indicating signal representative of the magnitude of a manually entered steering demand for said primary steerable wheel;

a wheel speed monitoring means for monitoring the rotation speed of each of said primary and subsidiary steerable wheels for producing a wheel speed indicating signal;

means for deriving a calculated vehicle speed representing value on the basis of said wheel speed indicating signal from said wheel speed monitoring means, such that said calculated vehicle speed representing value is constantly held at a current value of said wheel speed indicating signal for a predetermined time interval when a speed difference between said wheel speed indicating signal and said calculated vehicle speed representing value is within a predetermined range, a velocity gradient for said calculated vehicle speed representing value is set to ta predetermined velocity gradient so as to decrease said speed difference with said predetermined velocity gradient when said speed difference exceeds said predetermined range at an expiration of said predetermined time interval or when said speed difference is less than said predetermined range at expiration of said predetermined time interval; and a first control system for determining an optimal magnitude of said assistant force by said subsidiary wheel steering control signal derived on the basis of both said steering wheel angle indicating signal and said calculated vehicle speed representing value.

2. The four wheel steering control system as set forth in claim 1, wherein said first control system operates in conjunction with a second control system which performs an anti-skid brake control for maintaining wheel slippage at a predetermined level.

3. The four wheel steering control system as set forth in claim 2, wherein said means for deriving said calculated vehicle speed representing value, is commonly employed in both of said first and second control systems.

4. In a combination of a four wheel steering control system for an automotive vehicle which includes a primary steerable wheel turned by a manually operable vehicular steering mechanism, and a subsidiary steerable wheel, and an anti-skid brake control system which controls braking pressure applied for respective wheels on the basis of a wheel slippage derived on the basis of a wheel speed indicating signal value and a vehicle speed representing value, said four wheel steering control system comprises:

a subsidiary wheel toe control mechanism operatingly connected to said subsidiary steerable wheel for controlling a toe angle according to a subsidiary wheel steering control signal, said subsidiary wheel toe control mechanism including a power assist cylinder for generating assistant force so as to turn said subsidiary wheel;

a steering wheel angle sensing means disposed adjacent to said manually operable steering mechanism for producing a steering wheel angle indicating signal representative of the magnitude of a manually entered steering demand for said primary steerable wheel;

a wheel speed monitoring means for monitoring the rotation speed of each of said primary and subsidiary steerable wheels for producing a wheel speed indicating signal;

means for deriving a calculated vehicle speed representing value on the basis of said wheel speed indicating signal from said wheel speed monitoring means, such that said calculated vehicle speed representing value is constantly held at a current value of said wheel speed indicating signal for a predetermined time interval when a speed difference between said wheel speed indicating signal and said calculated vehicle speed representing value is within a predetermined range, a velocity gradient for said calculated vehicle speed representing value is set to a predetermined velocity gradient so as to decrease said speed difference with said predetermined velocity gradient when said speed difference exceeds said predetermined range at an expiration of said predetermined time interval or when said speed difference is less than said predetermined range at an expiration of said predetermined time interval; and a control unit for determining an optimal magnitude of said assistant force by said subsidiary wheel steering control signal derived on the basis of both of said steering wheel angle indicating signal and said calculated vehicle speed representing value.

5. A steering control system for an automotive vehicle employing an assistant steering mechanism for applying assistant force to at least one of a steering mechanism turning front wheels and a steering mechanism turning rear wheels, on the basis of at least a steering wheel angle and a vehicle speed, comprising:

a steering wheel angle sensor for monitoring said steering wheel angle, to generate a steering wheel angle indicating signal;

means for monitoring each wheel speed of said wheels, to produce wheel speed indicating signals;

means for deriving a calculated vehicle speed representing value on the basis of said wheel speed indicating signals from said wheel speed monitoring means, such that when a speed difference between a highest value of said wheel speed indicating signals and said calculated vehicle speed representing value is within a predetermined range, said calculated vehicle speed representing value is constantly held at a current highest value of said wheel speed indicating signals for a predetermined time interval and a velocity gradient for said calculated vehicle speed representing value is set to a predetermined velocity gradient so as to decrease said speed difference with said predetermined velocity gradient when said speed difference exceeds said predetermined range at an expiration of said predetermined time interval or when said speed difference is less than said predetermined range at an expiration of said predetermined time interval; and a control unit for determining an optimal magnitude of said assistant force on the basis of both of said steering wheel angle indicating signal and said calculated vehicle speed representing value.

6. The steering control system as set forth in claim 5, wherein said means for deriving said caluated vehicle speed representing value, sets said predetermined velocity gradient to a positive velocity gradient when said speed difference exceeds said predetermined range, and to a negative velocity gradient when said speed difference is less than said predetermined range, so as to decrease said speed difference.

7. The steering control system as set forth in claim 6, which further comprises acceleration sensor for monitoring a vehicular body longitudinal acceleration or a vehicular body longitudinal deceleration, and means for generating said negative velocity gradient being dependent on said longitudinal acceleration deceleration monitored by said longitudinal sensor.

8. The steering control system as set forth in claim 5, wherein said assistant steering mechanism comprises a power assist cylinder.

9. A steering control system for an automotive vehicle employing an assistant steering mechanism for applying assistant force to at least one of a steering mechanism turning front wheels and a steering mechanism turning rear wheels, on the basis of at least a steering wheel angle and a vehicle speed, and an anti-skid brake control system for controlling behavior, comprising:

a steering wheel angle sensor for monitoring said steering wheel angle, to generate a steering wheel angle indicating signal;

means for monitoring each wheel speed of said wheels, to produce wheel speed indicating signals;

means for deriving a calculated vehicle speed representing value on the basis of said wheel speed indicating signals from said wheel speed monitoring means, such that when a speed difference between a highest value of said wheel speed indicating signals and said calculated vehicle speed representing value is within a predetermined range, said calculated vehicle speed representing value is constantly held at a current highest value of said wheel speed indicating signals for a predetermined time interval and a velocity gradient for said calculated vehicle speed representing value is set to a predetermined velocity gradient so as to decrease said speed difference with said predetermined velocity gradient when said speed difference exceeds said predetermined range at an expiration of said predetermined time interval or when said speed difference is less than said predetermined range at an expiration of said predetermined time interval;

a control unit for determining an optimal magnitude of said assistant force on the basis of both of said steering wheel angle indicating signal and said calculated vehicle speed representing value; and said means for deriving said calculated vehicle speed representing value, including means for setting said predetermined velocity gradient to a first positive velocity gradient when said speed difference exceeds said predetermined range at an expiration of said predetermined time interval and said anti-skid brake control system is deactive, to a second positive velocity gradient when said speed difference exceeds said predetermined range at an expiration of said predetermined time interval and said anti-skid brake control system is active, and to a negative velocity gradient when said speed difference is less than said predetermined range at an expiration of said predetermined time interval, so as to decrease said speed difference.

10. The steering control system as set forth in claim 9, wherein said first positive velocity gradient is selected to be less than said second positive velocity gradient.

11. The steering control system as set forth in claim 10, wherein said first positive velocity gradient is set to +0.4 and said second positive velocity gradient is set to +10g.

12. The steering control system as set forth in claim 9, which further comprises a longitudinal acceleration sensor for monitoring a vehicular body longitudinal acceleration or a vehicular body longitudinal deceleration, and means for generating said negative velocity gradient being dependent on said longitudinal deceleration monitored by said longitudinal acceleration sensor.

13. The steering control system as set forth in claim 12, wherein said negative velocity gradient generating means comprises an adder for adding a given offset value to an absolute value of said longitudinal deceleration monitored by said longitudinal acceleration sensor and an inverter circuit for generating an inverted value of an adder output from said adder so as to derive said negative velocity gradient.

14. The steering control system as set forth in claim 13, wherein said given offset value is +0.3 .

15. The steering control system as set forth in claim 9, wherein said predetermined time interval is selected in such a manner as to be greater than a particular period of said highest value of said wheel speed indicative signals fluctuating periodically due to an anti-skid control cycle occurring when said anti-skid control system is active.

16. The steering control system as set forth in claim 9, wherein said assistant steering mechanism comprises a power assist cylinder.

* * * * *